United States Patent
Nakase et al.

[15] 3,652,436
[45] Mar. 28, 1972

[54] METHOD FOR POLYMERIZING TETRAOXANE

[72] Inventors: Yoshiaki Nakase; Masaru Yoshida; Akihiko Ito, all of Takasaki-shi; Seizo Okamura, Kyoto-shi, all of Japan

[73] Assignees: Mitsubishi Petrochemical Company Ltd., Tokyo; Ube Industries, Ltd., Ube-shi, Yamaguchi-ken, Japan

[22] Filed: Oct. 20, 1969

[21] Appl. No.: 867,933

[30] Foreign Application Priority Data

Sept. 6, 1969 Japan..................................44/70674

[52] U.S. Cl..................204/159.21, 260/32.4, 260/33.6, 260/33.8, 260/67 FP
[51] Int. Cl. ......................................C08g 1/00, C08g 11/00
[58] Field of Search..........................260/67 FP; 204/159.21

[56] References Cited

UNITED STATES PATENTS

| | | | |
|---|---|---|---|
| 3,236,784 | 2/1966 | Fischer | 260/67 FP X |
| 3,242,063 | 3/1966 | Okamura et al. | 204/159.21 |
| 3,305,464 | 2/1967 | Marans | 204/159.21 |
| 3,347,764 | 10/1967 | Matsumoto et al. | 204/159.21 |
| 3,457,226 | 7/1969 | Miyake et al. | 260/67 FP |

OTHER PUBLICATIONS

C & En, " Free Radical Induces Cationic Polymerization" Sept. 6, 1965, p. 40– 41 TP 1.I418

*Primary Examiner*—William M. Short
*Assistant Examiner*—L. M. Phynes
*Attorney*—McGlew and Toren

[57] ABSTRACT

Method for polymerizing tetraoxane by carrying out the polymerization at temperatures above 60° C. and in the presence of at least one hydrocarbon halide of the general formula $RX_n$, wherein R is a radical having one to 15 carbon atoms, and may be a saturated or unsaturated aliphatic or alicyclic hydrocarbon residue, with different substituents for hydrogen in the hydrocarbon residue, X may be F, Cl, Br, or I, and n a positive integer not exceeding 10. The polymerization reaction can be promoted by ionizing irradiation either before or after hydrogen halides are added to the tetraoxane. The molecular weight and the yield of the polymer obtained by the invention are increased as compared to those obtained by conventional methods.

13 Claims, No Drawings

METHOD FOR POLYMERIZING TETRAOXANE

DESCRIPTION OF THE INVENTION

This invention relates to an improved method for polymerizing tetraoxane. It has been known that tetraoxane is polymerized in solid state into polyoxymethylene by ionizing radiation and that in the presence of a catalyst such as boron trifluoride ($BF_3$), tetraoxane is also polymerized. The former method, however, is handicapped by the disadvantages that the rate of polymerization is low, and that when the yield of polymer is to be increased, the molecular weight of the polymer is inevitably reduced, and that when the polymer of high molecular weight is to be obtained, the yield of polymer is reduced; whereas the latter method is disadvantageous in that care has to be taken in handling a catalyst, such as boron trifluoride, which is very reactive, it is a further drawback that any catalyst remaining in the polymer product has to be neutralized after polymerization is completed.

It is an object of the invention to provide a method free from the abovementioned disadvantages, for preparing polymer of tetraoxane with ease at high polymerization rate and yield. Another object of the invention is to provide a new polymerization initiator to be employed for polymerizing tetraoxane. Still another object of this invention is to provide a novel method by which tetraoxane can be polymerized either in solid state or in liquid state.

These objects can be accomplished by polymerizing tetraoxane in the presence of hydrocarbon halides, and they can be more easily attained through two means, namely, the addition of hydrocarbon halides to tetraoxane and the application of ionizing radiation.

In accordance with the present invention, the above objects are effectively obtained by carrying out polymerization of tetraoxane at temperatures above 60° C. and in the presence of at least one hydrocarbon halide of the general formula:

$$RX_n$$

(wherein R is a radical having one to 15 carbon atoms selected from the group consisting of a saturated or unsaturated aliphatic hydrocarbon residue, a saturated or unsaturated alicyclic hydrocarbon residue and a radical in which any hydrogen atom of the residues is substituted by an aryl, alkoxy, carbonyl, alkoxycarbonyl or aryloxycarbonyl radical; X is halogen selected from the group consisting of F, Cl, Br and I and may represent either a single one or several of these halogens; and n is a positive integer not exceeding 10).

The polymerization of tetraoxane according to the invention can be carried out with tetraoxane either in solid state or in liquid state, or in the presence of a solvent, inert to formaldehyde. Tetraoxane may also be subjected to ionizing radiation either in the presence or in the absence of at least one hydrocarbon halide. In either case, the polymerization of tetraoxane is conducted in the presence of at least one hydrocarbon halide after and/or during the application of the ionizing radiation. In the latter case, the polymerization of tetraoxane is carried out in the presence of at lest one hydrocarbon halide after the irradiation.

The present invention is based on the observation that when tetraoxane is polymerized in the presence of at least one hydrocarbon halide, which is practically neutral, the polymer can be obtained at high polymerization rate and yield, so that the desired results can easily be achieved. It was further observed that when tetraoxane is subjected to ionizing radiation before and/or after the hydrocarbon halide is added, the objects described above are more easily accomplished, and that in such a case the polymerization yield is greater than when the tetraoxane is treated with ionizing radiation without the addition of the hydrocarbon halide, resulting in the reduction of the amount of unreacted monomer to be removed and also of the hydrocarbon halide to be used.

In addition to these industrial advantages, a polymer of extremely high molecular weight can be obtained at good yield, and therefore, the method can be advantageously applied to the production of a thermally stable polymer having a molecular weight suitable for practical use, by polymerizing tetraoxane in the presence of comonomers or any other substances reactive in the course of polymerization, which are apt to reduce the molecular weight of the polymer.

As mentioned above, in the polymerization of tetraoxane according to the present invention, the tetraoxane may be either in solid or liquid state. In the former case, a suspension of crystalline tetraoxane in a solvent inert to formaldehyde is also included. In the latter case, the tetraoxane may be heated at above its melting point (112° C.) in order to be liquefied, or it may be dissolved in a solvent inert to formaldehyde, such as cyclohexane, n-hexane, benzene and nitrobenzene.

The abovementioned hydrocarbon halides employed in practicing the method of the invention are exemplified by methylene chloride, ethylene chloride, chloroform, carbon tetrachloride, vinyl chloride, chloral, chloroacetone, chloromethyl acetate, phenyl chloroacetate, hexachloroethane, benzyl chloride, tetrafluoroethylene, dibromotetrafluoroethane, bromoform, tribromoacetaldehyde, aryl bromide, methyl bromide, ethyl bromide, methylene bromide, ethylene bromide, bromal, bromopropene, bromcyclohexane, chlorocyclohexane, benzyl bromide, methyl iodide, ethyl iodide, propyl iodide, isopropyl iodide, ethylene iodide, benzyl iodide, iodoform, 2-bromoethyl ethyl ether, chloromethyl ethyl ether, 2-chloroethyl ether, 3-bromocyclohexene, 3-chlorocyclohexene, and 4-chlorocyclohexene.

The total amount of hydrocarbon halides to be present in the polymerization system varies according to kinds of the hydrocarbon halides employed. When ionizing radiation is not applied, the hydrocarbon halides are used as reaction initiators, the amount being in the range of from 0.01 to 10 percent by weight, or preferably from 0.1 to 5 percent by weight, based on the amount of tetraoxane. In case ionizing radiation is applied, the amount of hydrocarbon halides is in the range of from $10^{-6}$ to 5 percent by weight, or preferably from $10^{-4}$ to 1 percent by weight. No particular way to add hydrocarbon halides to is considered preferable, so that the hydrocarbon halides may be brought into contact with tetraoxane either in liquid state or in solid state, or they may be mixed directly with tetraoxane in liquid state. The hydrocarbon halides may be dissolved in a solvent inert to formaldehyde and then added to tetraoxane. In the process, the tetraoxane may be allowed to stand at room temperature or higher temperatures for more than 1 hour after the hydrocarbon halides are added.

According to the method of the invention, polymerization is carried out in different ways; by (1) heating tetraoxane in the presence of at least one hydrocarbon halide, (2) subjecting tetraoxane to ionizing radiation in the presence of at least one hydrocarbon halide and then heating it also in the presence of the hydrocarbon halide, (3) subjecting tetraoxane to ionizing radiation and then heating it in the presence of at least one hydrocarbon halide, or (4) heating tetraoxane in the presence of at least one hydrocarbon halide while subjecting it to ionizing radiation. The polymerization temperatures are above 60° C., and such temperature range may preferably be between 60° C. and the melting point of tetraoxane when polymerization is carried out in solid state, and above 90° C. when it is carried out in liquid state. There is no particular limitation of the polymerization period, but in most cases, polymerization has sufficiently proceeded in a period of from 10 minutes to 2 hours.

Ionizing radiation may be applied to tetraoxane either before or at any time of or throughout the period of polymerization. Sometimes it may be applied both before and during the polymerization. The ionizing radiation applicable to this invention includes electromagnetic radiation with short wave length such as gamma rays or X-rays; high speed beams of electrons, protons, deuterons, alpha particles or nuclear fission fragments; and beams of neutral particles such as high speed neutrons, low speed neutrons or thermal neutrons. The dosage may be in the range of from $1 \times 10^2$ to $1 \times 10^9$ rad, and especially in the case of the in-source polymerization, the dose rate in the range of from $1 \times 10^2$ to $1 \times 10^9$ rad/hour is preferable. There is no particular limitation of the temperatures at which the ionizing radiation is to be applied, but when they are above 60° C., the in-source polymerization may take place during the irradiation unless the irradiation time is very short, for example, less than 1 minute at 105° C., $1 \times 10^6$ rad/hour.

The polymerization can be conducted in air, in a vacuum, or in an inert gas, but if the boiling point of the hydrocarbon halide employed in the polymerization is low, it can preferably be conducted in a closed system.

The product is washed with solvents for tetraoxane such as acetone, methanol, 2-propanol and water, so that unreacted tetraoxane may be removed. The hydrocarbon halides can also be removed at the same time and a white crystalline polymer is easily obtained.

The following are some examples of how to practice the present invention, which however are not to be construed as limiting the scope of the invention. In the examples, the intrinsic viscosity $[\eta]$ of the polymer is determined at 60° C. in the solution of p-chlorophenol containing 2 percent of α-pinene, the average thermal decomposition rate, $K_{222}$ (percent/min.) is measured in a nitrogen atmosphere at 222° C. for 1 hour, and percent means by weight.

EXAMPLE 1

One gram of tetroxane, purified by sublimation, was put into a vessel, to which was added 40 mg. of methylene chloride, and the system was closed and allowed to stand for 30 hours at room temperature. Then the vessel was immersed in a hot bath kept at 105° C. so that the content was allowed to polymerize for 20 minutes, and subsequently, the unreacted tetraoxane was removed by extraction with acetone. White crystalline polymer was obtained after having been dried at room temperature under reduced pressure. The polymer yield was 77 percent.

The same experiment was conducted in which the only exception was that the polymerization period was 40 minutes instead of 20 minutes, with a result that the polymer yield was 87 percent. The melting point of the product polymer was 185° C. and its intrinsic viscosity 1.8.

EXAMPLE 2

An experiment similar to the one described in Example 1 was carried out, in which the only exception was that the temperature of the heating bath was 60° C. instead of 105° C. The polymer yield was 37 percent, when the polymerization period was 20 min., and 62 percent when it was 40 min. In the latter case, the intrinsic viscosity of the polymer was 2.5.

EXAMPLE 3

An experiment similar to the one described in Example 1 was conducted, in which the only exceptions were that the temperature of the heating bath was 115° C. instead of 105° C., and the polymerization period was 40 min. A white polymer was obtained at a polymer yield of 80 percent, and the intrinsic viscosity of the polymer was 0.9.

EXAMPLE 4

An example similar to the one described in Example 1 was conducted, in which the only exceptions were that the temperature of the heating bath was 125° C. instead of 105° C. and the polymerization period was 30 min. A white product polymer was obtained at the polymer yield of 55 percent.

EXAMPLE 5

To 1 g. of tetraoxane purified by sublimation were added 40 mg. of ethylene chloride, and the system, after being closed and allowed to stand at room temperature for 24 hours, was subjected to polymerization in a heating bath kept at 60° C. for 40 min. Subsequently, the system was opened, and the unreacted tetraoxane was removed by extraction with acetone; a white polymer product was dried at room temperature under reduced pressure. The polymer yield was 17 percent and the intrinsic viscosity of the polymer 1.7.

EXAMPLE 6

To 1 g. of recrystallized tetraoxane were added 90 mg. of bromoform, and the system was closed and allowed to stand at room temperature for 24 hours; it was then subjected to polymerization for 60 minutes in a heating bath, kept at 105° C. After the unreacted tetraoxane was removed by extraction with acetone, a white polymer product was dried at room temperature under reduced pressure. The polymer yield was 90 percent and the intrinsic viscosity of the polymer 0.2.

EXAMPLE 7

An experiment similar to the one described in Example 6 was carried out, in which the only exception was the use of 80 mg. of tribromoacetaldehyde instead of 90 mg. of bromoform, resulting in a white polymer at a polymer yield of 86 percent.

EXAMPLE 8

An experiment similar to the one described in Example 6 was carried out in which the only exception was the use of 70 mg. of methyl iodide instead of 90 mg. of bromoform, whereby a white polymer at a polymer yield of 90 percent was obtained. The intrinsic viscosity of the polymer was 2.6.

EXAMPLE 9

An experiment similar to the one described in Example 6 was carried out in which the only exception was the use of 40 mg. of vinyl chloride instead of 90 mg. of bromoform, whereby a white polymer at a polymer yield of 10 percent was obtained. The intrinsic viscosity of the polymer was 0.6.

EXAMPLE 10

One gram of tetraoxane purified by sublimation was put into a glass ampule, and heated to 120° C. so that the tetraoxane became molten, then 1 percent of methylene chloride was added on the amount of tetraoxane. The ampule was sealed and allowed to stand at the same temperature for 1 hour. Then the ampule was opened, and the content, after being well washed with acetone in order to remove unreacted tetraoxane and the additive, was dried under reduced pressure for 24 hours, whereby a polymer in white crystals at a polymer yield of 75 percent was obtained. The intrinsic viscosity of the polymer was 0.4.

An experiment similar to the one described above was conducted, in which methyl iodide was employed instead of methylene chloride, with the result of a polymer at a yield of 60 percent and the intrinsic viscosity of 0.7.

EXAMPLE 11

One gram of tetraoxane purified by sublimation and 4 ml. of cyclohexane were put into a glass ampule fitted with a break seal, and after being sealed, the ampule was heated to 120° C. so that the tetraoxane became molten. Subsequently, the seal was broken, and 2 percent of methylene chloride were added based on the amount of tetraoxane; and the content was allowed to stand at the same temperature for 1 hour, thereby polymerizing tetraoxane.

After polymerization, the product was treated as in the previous examples, whereby a polymer at a polymer yield of 20 percent was obtained. The intrinsic viscosity of the polymer proved to be 1.9.

When another experiment similar to the above-given one was carried out, in which the only exception was the use of hexachloroethane instead of methylene chloride, the polymer yield was 35 percent and the intrinsic viscosity of the product 0.7.

EXAMPLE 12

Tetraoxane purified by sublimation was dissolved in nitrobenzene so as to prepare a 29 percent solution, to which were added 9 percent of methyl iodide based on the amount of tetraoxane, polymerization was made to take place for 1 hour at 90° C., 100° C., 110° C., or 120° C. The product obtained was treated just as in Example 10, yielding results given in Table 1.

TABLE 1

| Temperature (°C) | Polymer yield (%) | Intrinsic viscosity ($\eta$) |
|---|---|---|
| 90 | 5 | 0.8 |
| 100 | 35 | 1.2 |
| 110 | 60 | 1.9 |
| 120 | 65 | 5.5 |

EXAMPLE 13

Tetraoxane purified by sublimation was dissolved in benzene so as to prepare a 67 percent solution, to which was added methyl iodide in the respective amounts given in Table 2 and polymerized at 100° C. for the periods of time also indicated in Table 2. The product obtained was treated as in Example 10. Depending on the amounts of methyl iodide used and the polymerization time, the results given in Table 2 were obtained.

TABLE 2

| Amount of methyl iodide added (% based on the amount on of tetraoxane) | Polymerization period (hr.) | Polymer yield (%) | Intrinsic viscosity ($\eta$) |
|---|---|---|---|
| 0.1 | 1 | 3 | 1.0 |
| 2.5 | 0.5 | 15 | 1.0 |
| 2.5 | 1 | 12 | 0.7 |
| 2.5 | 2 | 45 | 1.0 |
| 2.5 | 8 | 50 | 1.3 |
| 5.0 | 1 | 25 | 1.0 |

EXAMPLE 14

Tetraoxane purified by sublimation was dissolved at 100° C. in various solvents, and to each of the solutions was added 8 percent of bromoform based on the amount of tetraoxane; the solutions were allowed to stand at the same temperature for 1 hour in order to carry out polymerization. The results obtained are as given in Table 3.

TABLE 3

| Solvent | Concentration of tetraoxane (%) | Polymer yield (%) | Intrinsic viscosity ($\eta$) |
|---|---|---|---|
| Cyclohexane | 33 | 36 | 0.7 |
| Benzene | 67 | 52 | 0.4 |
| Nitrobenzene | 41 | 2 | — |

EXAMPLE 15

Tetraoxane purified by sublimation was dissolved at 100° C. in nitrobenzene in order to obtain a 41 percent solution, to which were added 5 percent, based on the amount of tetraoxane, of a mixture of methyl iodide and methyl chloride, or of methyl iodide and bromoform; polymerization was carried out at 100° C. for 1 hour and the treatment occurred as described in Example 10, with the results obtained as given in Table 4.

TABLE 4

| Hydrocarbon halide | Ratio | Polymer yield (%) | Intrinsic viscosity ($\eta$) |
|---|---|---|---|
| Methyl iodide methyl chloride | 100:16 | 50 | 1.1 |
| Methyl iodide bromoform | 100:30 | 75 | 1.4 |

EXAMPLE 16

Tetraoxane purified by sublimation was dissolved at 120° C. in various solvents, to each of which was added a different kind of hydrocarbon halide, and after the system was well degassed at a dry ice temperature, polymerization was carried out for 1 hour. When the product was treated as described in Example 10, the results given in Table 5 were obtained.

TABLE 5

| Conditions of polymerization | | | Results | | |
|---|---|---|---|---|---|
| Concentration of tetraoxane, percent | Solvent | Hydrocarbon halide | Amount of hydrocarbon halide, percent | Polymer yield, percent | Intrinsic viscosity [$\eta$] |
| 100 | — | Bromoform | 5.8 | 100 | 0.9 |
| 100 | — | Methyl iodide | 4.5 | 100 | 0.8 |
| 72 | Cyclohexane | Bromoform | 5.8 | 60 | 1.2 |
| 63 | Nitrobenzene | Methyl iodide | 4.5 | 80 | 1.7 |
| 56 | Cyclohexane | Bromoform | 5.8 | 50 | 0.9 |
| 46 | Nitrobenzene | Methyl iodide | 4.5 | 68 | 0.8 |

EXAMPLE 17

One gram of purified tetraoxane was put into a glass ampule to which was added 3 percent of 1,3-dioxolane, and the mixture was heated to 120° C. to be liquefied. 5 percent of methyl iodide was added and then polymerization was conducted for 20 min. The product was treated as described in Example 10, leading to a copolymer at a polymer yield of 75 percent. The intrinsic viscosity of the copolymer proved to be 0.8. $K_{222}$ of the copolymer thus obtained was 0.4 percent/min., whereas that of a polymer prepared in the absence of dioxolane was 1.3 percent/min.

EXAMPLE 18

One gram of tetrahexane purified by sublimation was put into a glass ampule, to which was added methyl iodide dissolved in cyclohexane, and the ampule was sealed. Then it was irradiated at −78° C. with γ-rays from a cobalt 60 radiation source, and heated to 105° C. to polymerize for 2 hours. After polymerization, the ampule was opened, and the content was well washed with acetone so that unreacted tetraoxane and additives were removed, then the product was dried under reduced pressure, yielding a white polymer product.

Various polymerizing conditions under which the experiments were conducted and the results obtained are given in Table 6.

TABLE 6

| Experiment No. | Conditions of polymerization | | Results | |
|---|---|---|---|---|
| | Amount of methyl iodide, percent | Absorbed dose, rad. | Polymer yield, percent | Intrinsic viscosity $[\eta]$ |
| Example 18-1 | $1 \times 10^{-4}$ | $1 \times 10^6$ | 92 | 1.3 |
| Example 18-2 | $1 \times 10^{-4}$ | $1 \times 10^5$ | 82 | 1.7 |
| Control 18-1 | $1 \times 10^{-4}$ | | <2 | |
| Example 18-3 | $1 \times 10^{-2}$ | $1 \times 10^6$ | 93 | 2.1 |
| Example 18-4 | $1 \times 10^{-2}$ | $1 \times 10^5$ | 87 | 3.5 |
| Control 18-2 | $1 \times 10^{-2}$ | | <5 | 2.4 |
| Example 18-5 | 1.0 | $1 \times 10^6$ | 100 | 2.1 |
| Example 18-6 | 1.0 | $1 \times 10^5$ | 96 | 3.3 |
| Control 18-3 | 1.0 | | 86 | 4.6 |
| Example 18-4 | (1) | $1 \times 10^6$ | 42 | 1.1 |
| Example 18-5 | (1) | $1 \times 10^5$ | 38 | 1.6 |

[1] None.

EXAMPLE 19

One gram of tetraoxane purified by sublimation was put into a glass ampule, the ampule was sealed and irradiated at $-78°$ C. with $\gamma$-rays from a cobalt 60 radiation source. Then the ampule was opened, and to the content was added and methyl iodide dissolved in cyclohexane, and then heating to 105° took place for polymerization during 2 hours. The product was treated as described in Example 18, yielding a white crystalline polymer. The polymerization conditions and the results obtained are given in Table 7.

TABLE 7

| Experiment No. | Conditions of polymerization | | Results | |
|---|---|---|---|---|
| | Amount of methyl iodide, percent | Absorbed dose, rad. | Polymer yield, percent | Intrinsic viscosity $[\eta]$ |
| Example 19-1 | $1 \times 10^{-4}$ | $1 \times 10^6$ | 86 | 0.8 |
| Example 19-2 | $1 \times 10^{-4}$ | $1 \times 10^5$ | 74 | 1.6 |
| Example 19-3 | $1 \times 10^{-2}$ | $1 \times 10^6$ | 90 | 1.6 |
| Example 19-4 | $1 \times 10^{-2}$ | $1 \times 10^5$ | 88 | 2.0 |
| Example 19-5 | 1.0 | $1 \times 10^6$ | 96 | 1.6 |
| Example 19-6 | 1.0 | $1 \times 10^5$ | 99 | 3.0 |

EXAMPLE 20

One gram of tetraoxane, purified by sublimation, was put into a glass ampule. Methylene chloride was added and the ampule was sealed. After the ampule was irradiated at $-78°$ C. with $\gamma$-rays from a cobalt 60 radiation source, it was heated either to 90° C. or 120° C., to polymerize for 2 hours. After polymerization, the ampule was opened, and the content was treated as described in Example 18, yielding a white crystalline polymer. The results of the experiments are given in Table 8.

TABLE 8

| Experiment No. | Conditions of polymerization | | | Results | |
|---|---|---|---|---|---|
| | Amount of methylene chloride, percent | Absorbed dose, rad. | Polymerization temperature, °C. | Polymer yield, percent | Intrinsic viscosity $[\eta]$ |
| Example 20-1 | 0.5 | $1 \times 10^5$ | 90 | 19 | 1.5 |
| Control 20-1 | 0.5 | | 90 | 3 | |
| Control 20-2 | (1) | $1 \times 10^5$ | 90 | 7 | 1.6 |
| Example 20-2 | 0.5 | $1 \times 10^5$ | 120 | 84 | 0.8 |
| Control 20-3 | 0.5 | | 120 | 10 | 0.7 |
| Control 20-4 | (1) | $1 \times 10^5$ | 120 | 30 | 2.0 |

[1] None.

EXAMPLE 21

One gram of tetraoxane purified by sublimation was put into a glass ampule and sealed. After irradiated at $-78°$ C. with $\gamma$-rays ($1 \times 10^5$ rad) from a cobalt 60 radiation source, the ampule was opened, and 0.5 percent of methylene chloride was added. The product was then heated either to 90° C. or 120° C. to polymerize for 2 hours, and the product was treated as described in Example 18, yielding a white crystalline polymer. The polymer yield and the intrinsic viscosity of each polymer thus prepared are given in Table 9.

TABLE 9

| Experiment No. | Polymerization temperature, °C. | Results | |
|---|---|---|---|
| | | Polymer yield, percent | Intrinsic viscosity $[\eta]$ |
| Example 21-1 | 90 | 21 | 1.0 |
| Example 21-2 | 120 | 75 | 1.3 |

EXAMPLE 22

One gram of tetraoxane purified by sublimation was dissolved in 1 ml. of nitrobenzene in a glass ampule, and after addition of methyl iodide or hexachloroethane, the ampule was sealed. Polymerization of the content in liquid state was carried out at 100° C. for 1 hour under irradiation of $\gamma$-rays ($1 \times 10^5$ rad/hour) from a cobalt 60 radiation source. The content was treated as described in Example 18, yielding a white polymer. Table 10 shows the results of the experiments.

TABLE 10

| Experiment No. | Conditions of polymerization | | Results | |
|---|---|---|---|---|
| | Amount of hydrocarbon halide, percent | Absorbed dose, rad. | Polymer yield, percent | Intrinsic viscosity $[\eta]$ |
| Example 22-1 | Methyl iodide, 0.2 | $1 \times 10^5$ | 15 | 0.4 |
| Control 22-1 | do | | 3 | |
| Example 22-2 | do | $1 \times 10^5$ | 65 | 1.3 |
| Control 22-2 | do | | 20 | 1.0 |
| Example 22-3 | Hexachloroethane, 0.1 | $1 \times 10^5$ | 10 | 0.7 |
| Control 22-3 | do | | 3 | 0.7 |
| Control 22-4 | None | $1 \times 10^5$ | <2 | |

EXAMPLE 23

One gram of tetraoxane purified by recrystallization in methylene chloride solution was put in a glass ampule and polymerized at 105° for 3 hours. In this case, 1 percent of methylene chloride had remained in the tetraoxane. After polymerization was completed, the content of the ampule was treated in similar manner to Example 18, to obtain a white crystalline polymer at a yield of 70 percent and the intrinsic viscosity of 1.0.

EXAMPLE 24

One gram tetraoxane, purified by sublimation, was put into a glass ampule, and 1 percent of methylal and 4 percent of methyl iodide, based on the amount of tetraoxane were added. The ampule was then sealed. Having been irradiated at $-78°$ C. with $\gamma$-rays ($1 \times 10^5$ rad) from a cobalt 60 radiation source, the content of the ampule was allowed to polymerize at 105° C. for 1 hour, and subsequently treated as described in Example 18, resulting in a white crystalline polymer at a yield of 96 percent. The intrinsic viscosity of the polymer thus obtained was 1.1, and the average thermal decomposition rate, $K_{222}$, was 0.25 percent/min., whereas that of another product prepared in the absence of methylal proved to be 1.0 percent/min.

What is claimed is:

1. A method for polymerizing tetraoxane which comprises carrying out the polymerization of tetraoxane at temperatures above 60° C. and in the presence of from $10^{-6}$ to 10 percent by weight, based on the amount of tetraoxane, of at least one hydrocarbon halide selected from the group consisting of $CH_2Cl_2$, $CH_3I$ and $CHBr_3$.

2. The method according to claim 1, wherein said tetraoxane is in solid state.

3. The method according to claim 1, wherein said tetraoxane is in liquid state.

4. The method according to claim 1, wherein the polymerization of tetraoxane is carried out in the presence of a solvent, inert to formaldehyde.

5. The method according to claim 1, wherein the tetraoxane is subjected to ionizing radiation.

6. The method according to claim 5, wherein the dosage of the ionizing radiation is in the range of from $1 \times 10^2$ to $1 \times 10^9$ rad.

7. The method according to claim 5, wherein the tetraoxane is subjected to ionizing radiation in the presence of the hydrocarbon halide before polymerization.

8. The method according to claim 7, wherein the dosage of the ionizing radiation is in the range of from $1 \times 10^2$ to $1 \times 10^9$ rad, and the amount of said hydrocarbon halide is in the range of from $10^{-6}$ to 5 percent by weight, based on the amount of tetraoxane.

9. The method according to claim 1, wherein said polymerization of said tetraoxane is carried out under irradiation of ionizing radiation.

10. The method according to claim 9, wherein the dose rate of ionizing radiation is in the range of from $1 \times 10^2$ to $1 \times 10^9$ rad/hour, the dosage of the ionizing radiation is in the range of from $1 \times 10^2$ to $1 \times 10^9$ rad, and the amount of said hydrocarbon halide is in the range of from $10^{-6}$ to 5 percent by weight, based on the amount of tetraoxane.

11. The method according to claim 1, wherein said tetraoxane is subjected to ionizing radiation in the presence of said hydrocarbon halide at temperatures lower than 60° C.

12. The method according to claim 11, wherein the dosage of the ionizing radiation is in the range of from $1 \times 10^2$ to $1 \times 10^9$ rad, and the amount of said hydrocarbon halide is in the range of from $10^{-6}$ to 5 percent by weight, based on the amount of tetraoxane.

13. The method according to claim 1, wherein the amount of said hydrocarbon halide is in the range of from 0.01 to 10 percent by weight, based on the amount of tetraoxane, when ionizing radiation is not applied.

* * * * *